Patented Oct. 11, 1932

1,882,426

UNITED STATES PATENT OFFICE

JOHANNES ALFRED KALIX, OF BRUSSELS, BELGIUM, ASSIGNOR TO UNION CHIMIQUE BELGE SOCIETE ANONYME, OF BRUSSELS, BELGIUM

INTENSIFIER FOR PHOTOGRAPHY

No Drawing. Application filed February 11, 1931, Serial No. 515,143, and in France December 31, 1930.

This invention relates to a method of preparing a solid uranium intensifier for photography, permitting to mix together the various ingredients without the danger of a chemical reaction between these ingredients taking place.

Hitherto the preparation and the packing of a uranium intensifier offered difficulties, owing to the fact that compounds such as a uranium salt and potassium ferricyanide react with each other when they are maintained in contact, and they should therefore be kept separated from each other.

It is known to mix uranium acetate in powder form and other subsidiary ingredients with adhesive substances, such as celluloid and amyl acetate soluble in acetic acid and water. These binders allow of obtaining the intensifier for photography in the form of tabloids. Such organic binders, however, offer serious drawbacks: they form an additional expense, are unstable and require special conditions of treatment for dissolving them.

The present invention has for its object a solid intensifier containing uranium salt or salts, which shall be stable, and which shall facilitate the packing and the use of the intensifier, without the use of any special binder.

It is known that a uranium intensifier contains usually ingredients such as the uranium salt itself, the nitrate for instance, ferricyanide of potassium, ordinary alum or potassium sulphate, citric acid or tartaric acid, etc.

According to the present invention, the uranium salt is intimately mixed with one or several of the usual mineral components of the intensifier which do not react in the solid state with the uranium salt and prevent a chemical reaction taking place between the product thus obtained and the other components of the intensifier after being mixed in the solid state.

For instance, uranium nitrate is intimately mixed with an alkaline sulphate or ordinary alum, by melting together the uranium nitrate and the sulphate or alum. The product thus obtained may be suddenly solidified and converted into powder form. The powder thus obtained may be mixed with potassium ferricyanide and with the other substances, without any chemical reaction taking place. The solid mixture thus obtained can be kept in the open air without alteration during one or two weeks, and in a well closed tube it may be kept without alteration, practically indefinitely. The usual ingredients, such as tartaric acid and its salts, citric acid and its salts, do not react with the products intimately mixed together, thus facilitating the conservation of the intensifier.

This intensifier may be used in the ordinary way, without any special precaution being necessary. It may be used as a red toning bath, by adding potassium ferricyanide. The quantitative constitution of the intensifier has no influence upon its stability.

Example of preparation of an intensifier according to the invention:

5 grams of potassium alum are melted with 1 gram of uranium nitrate; the product obtained is solidified and pulverized, then mixed with 0.6 gr. of potassium ferricyanide and 1 gr. of tartaric acid. The solid intensifier thus obtained may be conserved inside a tube and be used when required, to make 250 c. c. of solution capable of intensifying 10–12 proofs of 13×18 cm.

What I claim is:

1. In a method of preparing a solid photographic intensifier containing a uranium salt, a ferricyanide and other ingredients, melting the uranium salt together with alum, solidifying and pulverizing the mixture before mixing with the potassium ferricyanide.

2. In a method of preparing a solid photographic intensifier containing a uranium salt, a ferricyanide and other ingredients, intimately mixing the uranium salt with a sulfate of an alkali metal, solidifying and pulverizing the mixture, and mixing the latter with the potassium ferricyanide.

JOHANNES ALFRED KALIX.